United States Patent
Everard et al.

(10) Patent No.: US 9,458,754 B2
(45) Date of Patent: Oct. 4, 2016

(54) APPARATUS, METHOD, AND SYSTEM FOR DIAGNOSING REDUCTANT DELIVERY PERFORMANCE

(71) Applicants: Cummins IP, Inc., Minneapolis, MN (US); Roel Stas, Eindhoven (NL)

(72) Inventors: David S. Everard, Columbus, IN (US); Roel Stas, Eindhoven (NL)

(73) Assignee: CUMMINS IP, INC., Minneapolis, MN (US)

( * ) Notice: Subject to any disclaimer, the term of this patent is extended or adjusted under 35 U.S.C. 154(b) by 2 days.

(21) Appl. No.: 14/204,647

(22) Filed: Mar. 11, 2014

(65) Prior Publication Data

US 2014/0260216 A1 Sep. 18, 2014

Related U.S. Application Data

(60) Provisional application No. 61/783,123, filed on Mar. 14, 2013.

(51) Int. Cl.
*F01N 11/00* (2006.01)
*F01N 3/20* (2006.01)

(52) U.S. Cl.
CPC ............... *F01N 11/00* (2013.01); *F01N 3/208* (2013.01); *F01N 2550/00* (2013.01); *F01N 2550/05* (2013.01); *F01N 2610/02* (2013.01); *F01N 2610/03* (2013.01); *F01N 2900/0412* (2013.01); *F01N 2900/1808* (2013.01); *F01N 2900/1812* (2013.01); *Y02T 10/24* (2013.01); *Y02T 10/47* (2013.01)

(58) Field of Classification Search
CPC ............... F01N 11/00; F01N 2560/08; F01N 2610/144; F01N 2610/1433; F01N 2610/1493; F01N 2900/1808
See application file for complete search history.

(56) References Cited

U.S. PATENT DOCUMENTS

| | | | |
|---|---|---|---|
| 7,526,950 B2 | 5/2009 | Van Nieuwstadt et al. |
| 7,743,603 B2 | 6/2010 | Nishina et al. |
| 8,161,735 B2 | 4/2012 | Kitazawa |
| 8,161,808 B2 | 4/2012 | Crawford et al. |

(Continued)

FOREIGN PATENT DOCUMENTS

| WO | WO-2008/130284 | 10/2008 |
| WO | WO-2011/161162 | 12/2011 |

OTHER PUBLICATIONS

Extended European Search Report for European Patent Application No. 14159305.3, dated Jun. 24, 2014, 6 pages.

*Primary Examiner* — Jonathan Matthias
(74) *Attorney, Agent, or Firm* — Foley & Lardner LLP

(57) ABSTRACT

An exhaust gas treatment system for an internal combustion engine may have a reductant delivery system with a controller that performs period diagnostics to determine whether there is a blockage in the reductant delivery system. The diagnostic procedure may include sampling first and second pressures at first and second operating conditions, respectively, and then comparing the first pressure differential between the first and second pressures with one or more threshold pressure differentials to determine whether system components such as a dosing line and an injector are at least partially blocked. If such a test is not conclusive, it may be repeated at a third and fourth operating conditions to provide a second pressure differential. The offset between the first and second pressure differentials may also be used to help diagnose where a blockage in the system resides.

20 Claims, 6 Drawing Sheets

(56) References Cited

U.S. PATENT DOCUMENTS

| | | |
|---|---|---|
| 8,171,721 B2 | 5/2012 | Boddy et al. |
| 8,276,437 B2 | 10/2012 | Kitazawa |
| 2008/0282681 A1 | 11/2008 | Katou et al. |
| 2010/0005871 A1* | 1/2010 | Kitazawa .................. 73/114.69 |
| 2010/0043409 A1 | 2/2010 | Naydenov et al. |
| 2010/0071349 A1* | 3/2010 | Kitazawa .............. F01N 3/2066 60/277 |
| 2011/0099983 A1 | 5/2011 | Ohno |
| 2011/0107742 A1 | 5/2011 | Igarashi et al. |

* cited by examiner

APPARATUS, METHOD, AND SYSTEM FOR DIAGNOSING REDUCTANT DELIVERY PERFORMANCE

CROSS-REFERENCE TO RELATED APPLICATION

The present application claims the benefit of and priority to U.S. Provisional Patent Application Ser. No. 61/783,123, filed Mar. 14, 2013, which is incorporated herein by reference in entirety.

FIELD

This disclosure relates to internal combustion engines, and more particularly to diagnosing the operation of a reductant delivery system for exhaust gas aftertreatment.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Consequently, the use of exhaust aftertreatment systems on engines to reduce emissions is increasing.

Generally, emission requirements vary according to engine type. Emission tests for compression-ignition (e.g., diesel) engines typically monitor the release of carbon monoxide (CO), unburned hydrocarbons (UHC), diesel particulate matter (PM) such as ash and soot, and nitrogen oxides ($NO_x$).

With regard to reducing $NO_x$ emissions, $NO_x$ reduction catalysts, including selective catalytic reduction (SCR) systems, are utilized to convert $NO_x$ (NO and $NO_2$ in some fraction) to $N_2$ and other compounds. SCR systems utilize a reductant, typically ammonia, to reduce the $NO_x$. Currently available SCR systems can produce high $NO_x$ conversion rates allowing the combustion technologies to focus on power and efficiency. However, currently available SCR systems also suffer from a few drawbacks.

SCR systems utilize a reductant delivery system to introduce ammonia reductant into the exhaust stream upstream of the SCR catalyst. When just the proper amount of ammonia is available at the SCR catalyst under the proper conditions, the ammonia is utilized to reduce $NO_x$. However, if the reduction reaction rate is too slow, or if a deficient amount of reductant is introduced into the exhaust stream upstream of the SCR catalyst, the SCR system may be unable to convert enough $NO_x$ to meet regulated emission standards associated with $NO_x$.

The reductant delivery system may under-deliver the needed amount of reductant or ammonia due to blockage of the reductant flow within the system. For example, there may be unintentional or intentional restrictions in the fluid transfer hose connecting the reductant pump with the injector of the delivery system. Alternatively, reductant may form deposits in the reductant delivery system (e.g., within the injector nozzle) and may restrict the flow of reductant through the system. Recent regulations governing SCR systems require on-board diagnostic (OBD) alerts indicating the failure of an SCR system to convert enough $NO_x$ to meet the regulated standards. One known indication of the inability of an SCR system to convert enough $NO_x$ is the inability to deliver the necessary amount of reductant for $NO_x$ conversion due to blockage within the reductant delivery system. Known systems and associated diagnostics fail to adequately diagnose poor performance of reductant delivery systems due to blockage or other failures, and thus may fail to meet the OBD requirements regarding the malfunction of reductant delivery systems.

SUMMARY

The subject matter of the present application has been developed in response to the present state of the art, and in particular, in response to the problems and needs in the art that have not yet been fully solved by currently available exhaust aftertreatment systems. Accordingly, the subject matter of the present application has been developed to provide apparatus, methods, and systems for diagnosing reductant delivery systems that overcomes at least some shortcomings of prior art aftertreatment systems.

In one embodiment, an apparatus is provided for diagnosing a reductant delivery system with a reductant pump. The apparatus may include a control module that operates the reductant pump to urge the reductant to flow through the reductant delivery system at a first operating condition and to urge the reductant to flow through the reductant delivery system at a second operating condition different from the first operating condition, a sampling module that samples a first pressure of reductant at the first operating condition and a second pressure of reductant at the second operating condition, a calculation module that calculates a first pressure differential between the first and second pressures, and a comparison module that compares the first pressure differential with a first threshold pressure differential to determine whether the reductant delivery system is operating properly.

The foregoing apparatus may further include a reporting module that reports a performance status indicating whether the reductant delivery system is functioning properly. The first threshold pressure differential may include an injector blockage threshold defining a pressure differential boundary between the reductant delivery system in an unblocked condition and the reductant delivery system with a blocked injector. If the first pressure differential is greater than or equal to the injector blockage threshold, the performance status may indicate that the reductant delivery system is functioning properly.

The comparison module may further compare the first pressure differential with a second threshold pressure differential to further determine whether the reductant delivery system is operating properly. The second threshold pressure differential may include a line blockage threshold defining a pressure differential boundary between the reductant delivery system with a blocked injector and the reductant delivery system with a blocked line. If the first pressure differential is less than the line blockage threshold, the performance status may indicate that the reductant delivery system is not functioning properly.

If the first pressure differential is more than the line blockage threshold, the control module may operate the reductant pump to urge the reductant to flow through the reductant delivery system at a third operating condition and to urge the reductant to flow through the reductant delivery system at a fourth operating condition different from the first, second, and third operating conditions. The sampling module may sample a third pressure of reductant at the third operating condition and a fourth pressure of reductant at the fourth operating condition. The calculation module may calculate a second pressure differential between the third and fourth pressures. The comparison module may compare the second pressure differential with a second threshold pressure differential to further determine whether the reductant delivery system is operating properly.

At the first operating condition, the control module may operate the reductant pump to urge the reductant to flow through the reductant delivery system at a first flow rate needed to maintain the first pressure at a target pressure with no dosing of reductant.

At the second operating condition, the control module may operate the reductant pump to urge the reductant to flow through the reductant delivery system at a second flow rate based on the first flow rate with dosing of reductant.

The control module may further operate the reductant pump to urge the reductant to flow through the reductant delivery system at a third operating condition and to urge the reductant to flow through the reductant delivery system at a fourth operating condition different from the third operating condition. The sampling module may further sample a third pressure of reductant at the third operating condition and a fourth pressure of reductant at the fourth operating condition. The calculation module may further calculate a second pressure differential between the third and fourth pressures, and may further calculate an offset pressure differential separating the first and second pressure differentials. The comparison module may further compare the offset pressure differential with a threshold offset pressure differential to further diagnose operation of the reductant delivery system.

The foregoing apparatus may further include a reporting module that reports a performance status indicating whether the reductant delivery system is functioning properly. If the offset pressure differential is greater than or equal to the threshold offset pressure differential, the performance status may indicate that the reductant delivery system is not functioning properly. If the offset pressure differential is less than the threshold offset pressure differential, the performance status may indicate that the reductant delivery system is functioning properly.

An internal combustion engine system according to the invention may include an internal combustion engine, an exhaust aftertreatment system in exhaust receiving communication with the internal combustion engine, a reductant delivery system in reductant supplying communication with exhaust in the exhaust aftertreatment system, the reductant delivery system comprising a reductant pump, and a controller that determines whether the reductant delivery system is operating properly by sampling pressures of reductant with the reductant pump urging the reductant to flow through the reductant delivery system at two different operating conditions, calculating a first differential pressure separating the pressures sampled, and comparing the first pressure differential with a threshold pressure differential.

If the reductant delivery system is not operating properly due to blockage in the reductant delivery system, the controller may further determine whether the blockage is in a dosing line or an injector of the reductant delivery system. In some implementations, the dosing line can be any fluid hose connecting component of a reductant delivery system.

In one embodiment, a method is provided for diagnosing a reductant delivery system having a reductant pump and a reductant doser. The method may include operating the reductant pump to urge the reductant to flow through the reductant delivery system at a first operating condition, sampling reductant pressure during operation of the reductant pump to urge the reductant to flow through the reductant delivery system at the first operating condition to determine a first pressure at which the reductant is pressurized within the reductant delivery system, operating the reductant pump to urge the reductant to flow through the reductant delivery system at a second operating condition different from the operating condition, sampling reductant pressure during operation of the reductant pump to urge the reductant to flow through the reductant delivery system at the second operating condition to determine a second pressure at which the reductant is pressurized within the reductant delivery system, calculating a pressure differential between the first and second pressures to provide a first pressure differential, and comparing the first pressure differential with a threshold pressure differential to determine whether the reductant delivery system is operating properly.

The method may further include reporting a performance status indicating whether the reductant delivery system is functioning properly. The first threshold pressure differential may be an injector blockage threshold defining a pressure differential boundary between the reductant delivery system in an unblocked condition and the reductant delivery system with a blocked injector. If the first pressure differential is greater than or equal to the injector blockage threshold, the performance status indicates that the reductant delivery system is functioning properly.

The method may also include comparing the first pressure differential with a second threshold pressure differential to further determine whether the reductant delivery system is operating properly. The second threshold pressure differential may include a line blockage threshold defining a pressure differential boundary between the reductant delivery system with a blocked injector and the reductant delivery system with a blocked line. If the first pressure differential is less than the line blockage threshold, the performance status may indicate that the reductant delivery system is not functioning properly.

If the first pressure differential is more than the line blockage threshold, the method may also include the steps of operating the reductant pump to urge the reductant to flow through the reductant delivery system at a third operating condition and to urge the reductant to flow through the reductant delivery system at a fourth operating condition different from the first, second, and third operating conditions, sampling a third pressure of reductant at the third operating condition and a fourth pressure of reductant at the fourth operating condition, calculating a second pressure differential between the third and fourth pressures, and comparing the second pressure differential with a second threshold pressure differential to further determine whether the reductant delivery system is operating properly.

Operating the reductant pump to urge the reductant to flow through the reductant delivery system at a first operating condition may include urging the reductant to flow through the reductant delivery system at a first flow rate needed to maintain the first pressure at a target pressure with no dosing of reductant.

Operating the reductant pump to urge the reductant to flow through the reductant delivery system at a second operating condition may include operating the reductant pump to urge the reductant to flow through the reductant delivery system at a second flow rate based on the first flow rate with dosing of reductant.

The method may further include operating the reductant pump to urge the reductant to flow through the reductant delivery system at a third operating condition, sampling reductant pressure during operation of the reductant pump to urge the reductant to flow through the reductant delivery system at the third operating condition to determine a third pressure at which the reductant is pressurized within the reductant delivery system, operating the reductant pump to urge the reductant to flow through the reductant delivery system at a fourth operating condition different from the third operating condition, sampling reductant pressure during operation of the reductant pump to urge the reductant to flow through the reductant delivery system at the fourth operating condition to determine a fourth pressure at which the reductant is pressurized within the reductant delivery system, calculating a second pressure differential between the third and fourth pressures, calculating an offset pressure differential separating the first and second pressure differentials, and comparing the offset pressure differential with a threshold offset pressure differential to further diagnose operation of the reductant delivery system.

The method may further include reporting a performance status indicating whether the reductant delivery system is functioning properly. If the offset pressure differential is greater than or equal to the threshold offset pressure differential, the performance status may indicate that the reductant delivery system is not functioning properly.

If the offset pressure differential is less than the threshold offset pressure differential, the performance status may indicate that the reductant delivery system is functioning properly.

According to another embodiment, an apparatus is provided for diagnosing a reductant delivery system including a reductant pump. The apparatus may include a control module that operates the reductant delivery system at a first operating condition, at a second operating condition different from the first operating condition, at a third operating condition, and at a fourth operating condition different from the third operating condition, a sampling module that samples a first pressure of reductant at the first operating condition, samples a second pressure of reductant at the second operating condition, samples a third pressure of reductant at the third operating condition, and samples a fourth pressure of reductant at the fourth operating condition, a calculation module that calculates a first pressure differential between the first and second pressures, calculates a second pressure differential between the third and fourth pressures, and further calculates an offset pressure differential separating the first and second pressure differentials, and a comparison module that compares the offset pressure differential with a threshold offset pressure differential to determine whether the reductant delivery system is operating properly.

The apparatus may also include a reporting module that reports a performance status indicating whether the reductant delivery system is functioning properly. If the offset pressure differential is greater than or equal to the threshold offset pressure differential, the performance status may indicate that the reductant delivery system is not functioning properly. If the offset pressure differential is less than the threshold offset pressure differential, the performance status may indicate that the reductant delivery system is functioning properly.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
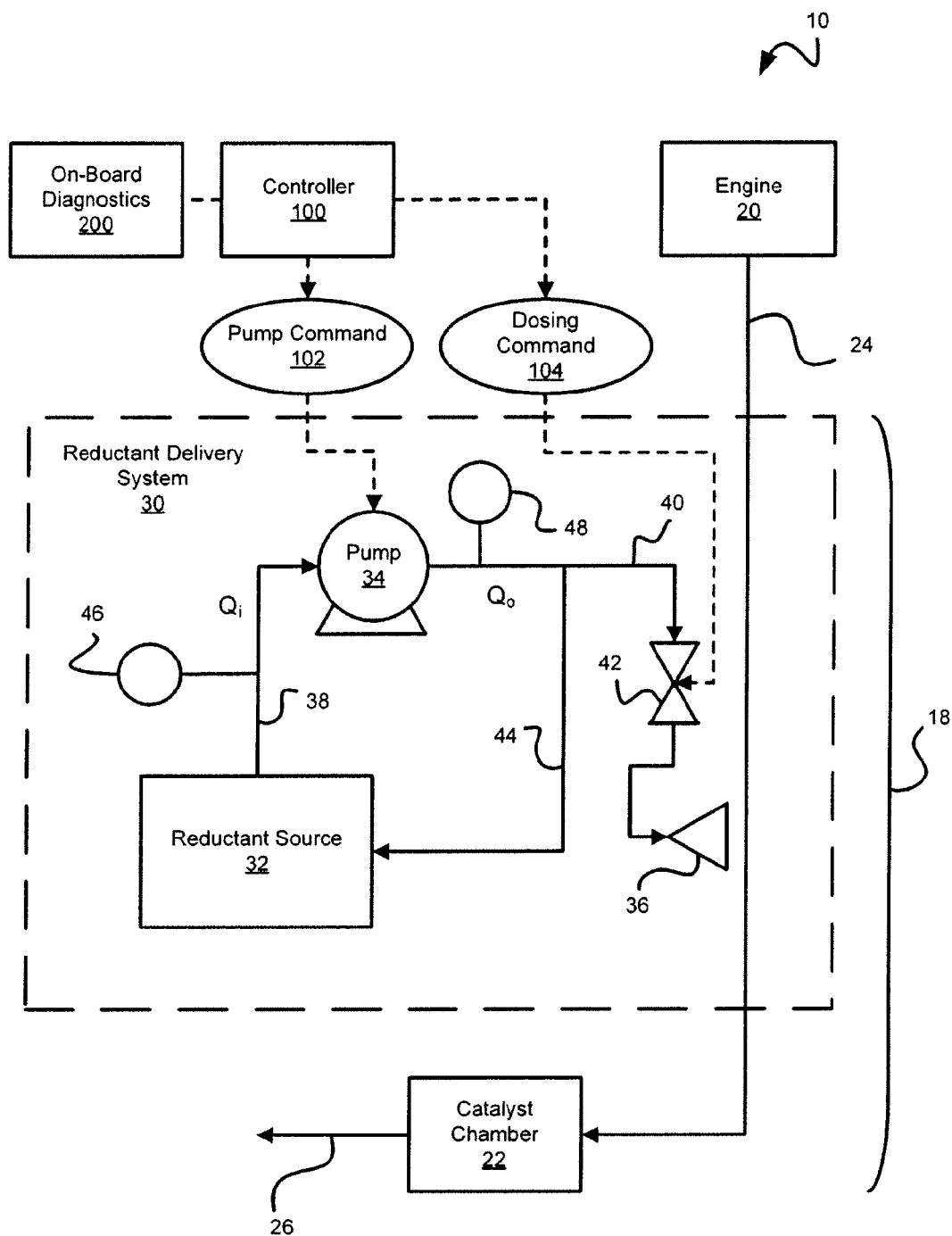
FIG. 1 is a schematic diagram of an engine system having an internal combustion engine and a reductant delivery system in accordance with one representative embodiment.

FIG. 1 depicts one embodiment of an engine system 10. The main components of the engine system 10 include an internal combustion engine 20 and an exhaust gas aftertreatment system, which may take the form of a selective catalytic reduction system or SCR system 18, including a catalyst chamber 22 in exhaust gas-receiving communication with the engine 20 via an exhaust manifold 24. The SCR catalyst chamber 22 includes an SCR catalyst configured to interact with the exhaust gas and reduce $NO_x$ in the presence of ammonia. The internal combustion engine 20 can be a compression-ignited internal combustion engine, such as a diesel fueled engine, or a spark-ignited internal combustion engine, such as a gasoline fueled engine operated lean. Combustion of the fuel and air in the compression chambers of the engine 20 produces exhaust gas that is operatively vented to an exhaust manifold 24. From the exhaust manifold 24, at least a portion of the exhaust gas stream flows from the exhaust manifold into and through the exhaust gas aftertreatment system prior to being vented into the atmosphere through a tailpipe 26.

Generally, the SCR system 18 is configured to remove various chemical compounds and particulate emissions present in the exhaust gas received from the exhaust manifold 24. In addition to the catalyst chamber 22, the SCR system 18 may include a reductant delivery system 30. Additionally or alternatively, the SCR system 18 may include any of various other exhaust treatment components known in the art, such as general oxidation catalysts, particulate matter filters, and ammonia oxidation catalysts.

The reductant delivery system 30 may include a reductant source 32, a pump 34, and a doser, which operates as a delivery mechanism and may take the form of an injector 36. The reductant source 32 can be a container or tank capable of retaining a reductant, such as, for example, ammonia ($NH_3$), urea, diesel fuel, diesel exhaust fluid, or diesel oil. The reductant source 32 is in reductant supplying communication with the pump 34, which is configured to pump reductant from the reductant source 32 to the injector 36. The injector 36 can be a reductant injector positioned upstream of the SCR catalyst chamber 22. The injector 36 is selectively controllable via actuation of a control valve 42 to inject a desired amount of reductant directly into the exhaust gas stream moving through the exhaust manifold 24 prior to the exhaust gas entering the catalyst chamber 22.

Referring again to FIG. 1, the reductant delivery system 30 may include reductant lines through which the reductant flows. In the illustrated embodiment, the system 30 includes a reductant supply line 38 and a reductant return line 44. The reductant supply line 38 facilitates the flow of reductant from the reductant source 32 to the injector 36. In contrast, the reductant return line 44 facilitates the flow of reductant from the supply line 38 (at a location downstream of the pump 34 and upstream of the injector 36) back to the reductant source 32. The pump 34 can be any of various fluid pumps known in the art. The pump 34 draws reductant from the reductant source 32 at an input pressure and delivers the reductant at an output pressure higher than the inlet pressure. The reductant entering the pump 34 is defined as reductant input flow $Q_i$ and the reductant exiting the pump is defined as reductant output flow $Q_o$.

The reductant delivery system 30 also may include a dosing line 40 downstream of the pump 34. The "dosing line" may refer to a fluid hose connecting components of the reductant delivery system 30 such as the pump 34 and the injector 36. The dosing line 40 may have a length and cross-section geometry selected to allow it to contain sufficient fluid to act as an accumulator. In the alternative, a separate accumulator (not shown) may be provided at any location on the dosing line 40. The accumulator 40 may accumulate and temporarily store a reservoir of reductant output flow $Q_o$ at the output pressure. In certain implementations, the dosing line 40 reduces the response time of the supply of pressurized reductant to the injector 36. The dosing line 40 may provide other benefits, such as energy conservation, absorption of hydraulic line shock, pressure holding, compensation for fluid leakage and thermal expansion/contraction, and the like. The system 30 may also include one or more pressure sensors 46, 48 that detect the pressure of the reductant within the system. In some implementations, the system 30 includes only the high pressure sensor 48 downstream of the pump 34, and in others, the system also includes the low pressure sensor 46 upstream of the pump 34.

Figure 2:
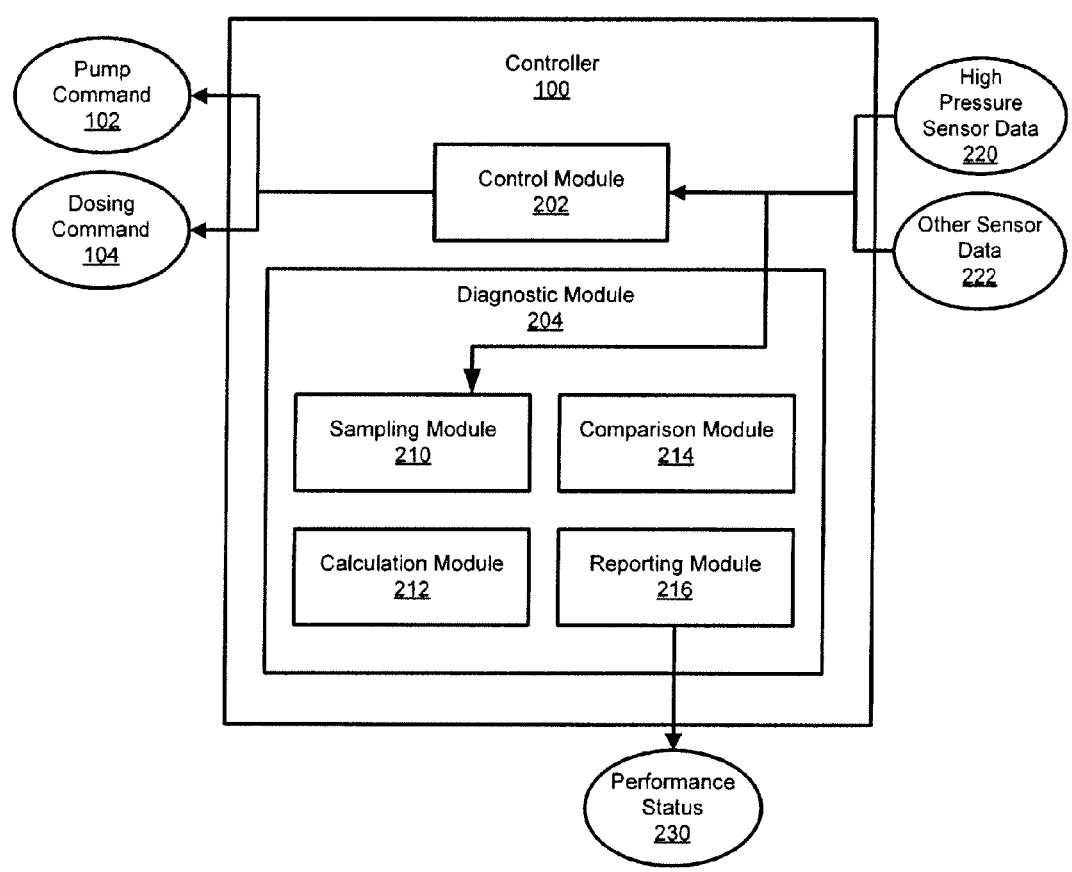
FIG. 2 is a schematic block diagram of a controller of the engine system of FIG. 1 in accordance with one representative embodiment.

The engine system 10 includes a controller 100 that controls the operation of the engine system 10 and associated sub-systems, such as the internal combustion engine 20 and the reductant delivery system 30. The controller 100 is depicted in FIGS. 1 and 2 as a single physical unit, but can include two or more physically separated units or components in some embodiments if desired. Generally, the controller 100 receives multiple inputs, processes the inputs, and transmits multiple outputs. The multiple inputs may include sensed measurements from the sensors and various user inputs. The inputs are processed by the controller 100 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired exhaust gas emissions.

Generally, in one embodiment, the controller 100 is configured to control the operation of the control valve 42 to inject a commanded amount of reductant into the exhaust gas stream. The controller 100 can generate the reductant dosing command based on any of various operating conditions and factors as is known in the art. The controller 100 also controls operation of the fluid pump 34 by regulating the speed of the pump. In one implementation, the controller 100 generates a pump command associated with a desired pump speed and transmits the pump command to the pump. Basically, the desired pump speed associated with the pump command corresponds with a desired output pressure of the reductant output flow $Q_o$.

Desirably, the actual output pressure of the reductant output flow $Q_o$ is maintained at the desired output pressure during operation to ensure a proper and accurate injection of reductant through the injector 36. Accordingly, the pump is operated at a speed to maintain the second pressure of the reductant output flow $Q_o$ at or near the desired output pressure. Therefore, based on the pressure detected or sensed by the pressure sensor 48, the controller 100 generates a pump command associated with a pump speed that maintains the actual output pressure at or near the desired output pressure. For example, if the actual output pressure of the reductant output flow $Q_o$ sensed by the pressure sensor 48 is below the desired output pressure (or if a pressure differential sensed by the pressure sensors 46, 48 is below a desired pressure differential), then the controller 100 issues a pump command to increase the speed of the pump 34, which results in an increase in the volumetric flow of reductant out of the pump 34, and a corresponding increase in the actual output pressure to meet the desired output pressure. In contrast, if the actual output pressure is above the desired output pressure (or if the pressure differential is above the desired pressure differential), then the controller 100 issues a pump command to decrease the speed of the pump 34 such that the actual output pressure is decreased to meet the desired output pressure. Accordingly, when the system pressure is stabilized, the pump command and pump speed provide a reliable indication of the output flow $Q_o$ exiting the pump 34.

The output pressure of the output flow $Q_o$ may fluctuate according to the position of the control valve 42 and, correspondingly, the amount of reductant flowing through the control valve 42 and into the exhaust gas stream through the injector 36. When the control valve 42 is closed, and no reductant is flowing through the valve, the pump 34 operates only to recirculate the internal flow $Q_1$ of reductant from the supply line 38 back to the reductant source 32. Accordingly, the pump command and speed necessary to maintain the output pressure of the reductant at the desired output pressure is held constant at a minimum pump command and speed. The pressure of the system 30 downstream of the pump 34 may be considered stabilized once the pressure meets the desired output pressure and the pump 34 is operating at the minimum pump speed.

However, as the control valve 42 is opened to effectuate the injection of reductant through the injector 36, the pump 34 must work harder to circulate the external flow of reductant to the injector 36, as well as recirculate the internal flow of reductant back to the reductant source, while maintaining the output pressure of the reductant at the desired output pressure. Therefore, the controller 100 must increase the speed of the pump 34 to account for the pressure loss associated with the external flow of reductant from the system 30. The more reductant exiting the system 30, the higher the pump speed, and vice versa.

Furthermore, the pressure measured by the high pressure sensor 48 downstream of the pump 34 will vary depending on the flow rate of fluid through the dosing line 40. More specifically, for the same pump command, the pressure in the dosing line 40 will be higher with a low flow rate of reductant than with a high rate. Consequently, if the dosing line 40, the injector 36, or the control valve 42 is clogged, closed, or otherwise occluded, the pressure for a given pump command will be higher than with the dosing line 40, injector 36, and control valve 42 open and clear of blockage. This pressure differential can be used to gauge the severity of blockage in elements 40, 36, and/or 42, and as will be demonstrated subsequently, can even be used to diagnose where such a blockage likely resides within the reductant delivery system 30.

The controller 100 may be designed to provide a performance status to an on-board diagnostic system 200, or OBD 200. The OBD 200 may convey the status to a user such as a driver of the vehicle containing the engine system 10, for example, with a light or LED, an auditory signal or alarm, an analog gauge, a digital readout, or the like.

Referring to FIG. 2, the controller 100 may include various modules for controlling the operation of the engine system 10. For example, the controller 100 may include one or more modules for controlling the operation of the reductant delivery system 30. As embodied in FIG. 2, the controller 100 includes a control module 202 and a diagnostic module 204. The control module 202 may control the ordinary operation of the reductant delivery system 30, and the diagnostic module 204 may, at desired times, evaluate the operation of the reductant delivery system 30. The diagnostic module 204 may include a sampling module 210, calculation module 212, comparison module 214, and reporting module 216.

While not specifically illustrated and described with reference to FIG. 2, the controller 100 can include additional controller modules for conducting other control system functions. The controller 100 and its various modular components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

In certain embodiments, the actual flow rate of reductant delivered may be a linear function of the pump command and/or the speed at which the pump 34 operates when the pressure within the system 30 downstream of the pump 34 is stabilized. For a given pump command, the pressure downstream of the pump 34 (as measured by the high pressure sensor 48) may be lower for a high flow rate, and conversely higher for a low flow rate, as set forth above. This relationship may be used by the controller 100 to diagnose the operation of the reductant delivery system 30 via the output provided by the high pressure sensor 48.

During normal operation of the reductant delivery system 30, the control module 202 may receive high pressure sensor data 220 from the high pressure sensor 48 to maintain the flow of reductant into the exhaust gas stream at the desired dosage rate. The dosage rate may be continuous or may vary, for example, in proportion to the loading of the internal combustion engine 20, the concentration of pollutants to be reduced within the exhaust gas stream, the speed of the vehicle having the engine system 10, and/or a variety of other factors. The control module 202 may receive other sensor data 222 from other sensors that provide data regarding the operation of the SCR system 18 such as, for example, low pressure sensor data from the low pressure sensor 46 if one is used.

According to other examples, other sensors (not shown) may include a flow meter positioned to measure the flow of reductant through the injector 36 and/or the reductant return line 44, a temperature sensor positioned proximate the injector 36, or other sensors, as known in the art. However, one benefit of the present disclosure is that these sensors may not be required to properly control and diagnose the operation of the reductant delivery system 30.

Based on programming, the high pressure sensor data 220, other sensor data 222 (if present), and/or user input, the control module 202 may issue the pump commands 102 and dosing commands 104, for example, to the pump 34 and the control valve 42, respectively. The pump command 102 may include a desired flow rate of reductant through the pump 34, a command to increase or decrease speed, or even a command to turn the pump 34 on or off. Thus, the control module 202 may issue pump commands 102 to regulate the operation of the reductant delivery system 30.

According to one example, the pump command 102 includes the flow rate the pump 34 is set to produce, and is therefore indicative of the flow rate of reductant through the reductant delivery system 30. The actual precise flow rate through the injector 36 may depend on factors such as the temperature of the reductant, the presence or absence of blockage in the various lines 38, 40, 44, the presence or absence of blockage in the control valve 42, and/or the presence or absence of blockage in the injector 36. Thus, the high pressure sensor data 220 may be used to help gauge the flow rate of reductant through the reductant delivery system 30.

At various times, the diagnostic module 204 may interrupt the operation of the control module 202 to initiate the performance of a diagnostic on the reductant delivery system 30. Since a blockage in the dosing line 40 and a blockage in the injector 36 may be the most common causes of failure of the reductant delivery system 30 to properly deliver reductant to the exhaust gas stream, the diagnostic module 204 may be particularly adapted to determine whether such a blockage is present. Optionally, the diagnostic module 204 may also be designed to determine where such blockage resides, as will be described subsequently.

The initiation of a performance diagnostic by the diagnostic module 204 may be dependent upon the satisfaction of certain enabling conditions. The performance diagnostic may be intrusive to the operation of the reductant delivery system 30, so it may be desirable to limit the frequency of such diagnostics. Accordingly, the enabling conditions may include the passage of a threshold amount of time, such as one World Harmonized Transient Cycle (WHTC) since performance of the last diagnostic. Additionally or alternatively, the enabling conditions may include a start-up sequence of the engine system 10, a certain amount of drive time or distance, or the satisfaction of other conditions since the last time the diagnostic was performed.

When the enabling conditions have been satisfied, the diagnostic module 204 may be engaged to interrupt the operation of the control module 202 to perform a diagnostic. Thus, the sampling module 210 may receive the high pressure sensor data 220 and the other sensor data 222, and may cause the control module 202 to issue pump commands 102 and dosing commands 104 to effectuate the diagnostic.

The calculation module 212 may use the data obtained by the sampling module 210 to calculate metrics useful in diagnosing the operation of the reductant delivery system 30, such as pressure differentials under different operating conditions of the reductant flow system 30, differences between such pressure differentials, or any other metrics that can help indicate how the reductant delivery system 30 is functioning.

The comparison module 214 may compare the metrics provided by the calculation module 212 with other data such as metrics obtained from previous operation of the reductant delivery system 30, established thresholds, or the like. The reporting module 216 may, based on the output of the comparison module 214, provide a performance status 230 of the reductant delivery system 30, for example, to the OBD 200. The performance status 230 may include a variety of data such as flow rates, pressures, temperatures, and other data reflecting the operating conditions of the reductant delivery system 30. In one embodiment, the performance status 230 simply indicates that the reductant delivery system 30 (1) is operating properly or (2) not operating properly. In yet one embodiment, the performance status 230 simply indicates that the reductant delivery system 30 (1) is operating properly, (2) is not operating properly due to blockage of a line 38, 40, and/or 44, or (3) is not operating properly due to blockage of the injector 36. The present subject matter may be used to detect blockage in any of the lines 38, 40, 44, but the following disclosure will focus on detecting blockage of the dosing line 40 by way of example.

In certain implementations, the diagnostic module 204 accumulates or sums the plurality of reductant flow errors and compares the accumulated reductant flow error with a predetermined threshold. The predetermined threshold can be a regulated threshold or some other threshold associated with a system having an undesirable or unlawful amount of blockage. If the accumulated reductant flow error meets the threshold, then the reporting module 216 issues a fail performance status 230. However, if the accumulated reductant flow error does not meet the threshold, then the reporting module 216 issues a pass performance status 230.

Alternatively, the performance status 230 can provide some other indication (e.g., poor) of the performance of the reductant delivery system 30 based on whether the accumulated reductant flow error meets the threshold. The diagnostic module 204 can compare the accumulated reductant flow error against multiple thresholds to provide a performance status 230 that indicates one of varying degrees of performance (e.g., poor, medium-poor, medium, medium-good, and good). In this manner, the OBD 200 is able to report to a user the evolution (e.g., rate of decay) of the performance of the reductant delivery system 30 over time such that a user can anticipate when the system 30 may reach a blockage level exceeding regulated amounts.

Figure 3:
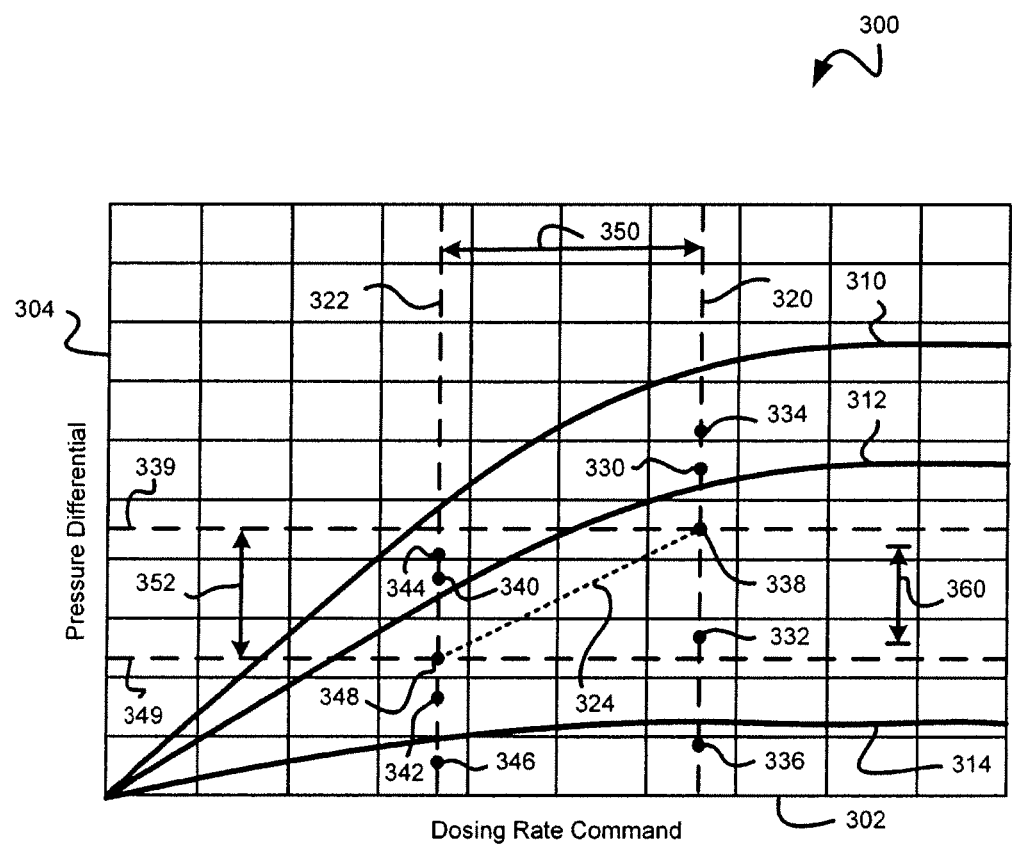
FIG. 3 is a chart illustrating a comparison between pressure differentials obtained under different operating conditions of the reductant delivery system including different commanded dosing rates.

Referring to FIG. 3, a graph 300 illustrates some of the data that may be collected and used by the diagnostic module 204 to determine the performance status 230. As shown, the graph 300 has a horizontal axis 302 and a vertical axis 304. The horizontal axis 302 provides the commanded dosing rate, such as that provided by the dosing command 104. The vertical axis 304 provides the pressure differential or "pressure drop" between the pressures sampled at different operating conditions, as will be described in greater detail subsequently.

The graph 300 shows three curves 310, 312, 314 that may represent data obtained from previous operation of the reductant delivery system 30 or from other reductant delivery systems. More precisely, the curves 310, 312, 314 include a normal system curve 310, a blocked injector curve 312, and a blocked line curve 314. The normal system curve 310 reflects how the reductant delivery system 30 should normally operate (i.e., without significant blockage of the injector 36 or the dosing line 40. The blocked injector curve 312 reflects how the reductant delivery system 30 would be expected to operate with an injector 36 that has become partially blocked, for example, via deposited exhaust particulate matter, deposited reductant, or other contaminants. The blocked line curve 314 reflects how the reductant delivery system 30 would be expected to operate with a dosing line 40 that has become partially blocked, for example, through improper installation of the reductant delivery system 30 in the vehicle, operator tampering, and/or improper maintenance.

As shown in FIG. 3, the curves 310, 312, 314 are distinctly different. Each of the curves 310, 312, 314 has a generally linear portion on the left side (i.e., the lower commanded dosing rates), which transitions into a curve that leads to a relatively flat zone on the right side (i.e., the higher commanded dosing rates). The blocked injector curve 312 is similar in shape to the normal system curve 310 but with overall lower pressure drops, and a slope that is smaller at the lower commanded dosing rates. The blocked line curve 314, by contrast, has dramatically lower pressure drops along its length, and a slope that is dramatically lower at the lower commanded dosing rates.

Where pressure data is sampled at a single commanded dosing rate, the difference in pressure differential between the curves 310, 312, 314 at the commanded dosing rate can be effectively used to diagnose the operation of the reductant flow system 30. Additionally or alternatively, where pressure data is sampled at multiple commanded dosing rates, the difference in slope between the curves 310, 312, 314 at the commanded dosing rates can be used to diagnose the operation of the reductant flow system.

According to one example, sampling, calculation, and comparison may first be carried out at a first dosing command rate 320. Then, if the results are inconclusive at the first commanded dosage rate 320, sampling, calculation, and comparison may then be carried out at a second dosing command rate 322. If the results are still inconclusive, the results at the two dosing command rates 320, 322 may be used together with the requisite calculation and comparison steps to obtain results based on the slope of a line 324 formed by the data points obtained. This slope may be proportional to the difference between pressure differentials (i.e., the pressure differential offset) at the first and second commanded dosing rates 320, 322.

As shown in FIG. 3, a variety of data points 330, 332, 334, 336, 338, 340, 342, 344, 346, 348 are shown by way of example. More particularly, at the first dosing rate command 320, an injector blockage threshold 330, a line blockage threshold 332, a first test point 334, a second test point 336, and a third test point 338 are shown.

The injector blockage threshold 330 may be at a pressure differential above the pressure differential of the blocked injector curve 312 at the first dosing rate command 320. If the pressure differential at the first dosing rate command 320 is greater than or equal to the injector blockage threshold 330 (for example, the first test point 334), the reductant delivery system 30 is operating close enough to the normal system curve 310 that no error is warranted.

The line blockage threshold 332 may be at a pressure differential above the pressure differential of the blocked line curve 314 at the first dosing rate command 320. If the pressure differential at the first dosing rate command 320 is less than the line blockage threshold 332 (for example, the second test point 336), the reductant delivery system 30 may be clearly operating below its desired capacity so that an error is warranted.

If the pressure differential at the first dosing rate command 320 is less than the injector blockage threshold 330, but more than the line blockage threshold 332 (for example, the third test point 338, which is at a first pressure differential 339), the status of the reductant delivery system 30 may not yet be clear. Accordingly, testing at the second dosing rate command 322 may be initiated. At the second dosing rate 322, an injector blockage threshold 340, a line blockage threshold 342, a first test point 344, a second test point 346, and a third test point 348 are shown.

The injector blockage threshold 340 may be at a pressure differential above the pressure differential of the blocked injector curve 312 at the second dosing rate command 322. If the pressure differential at the second dosing rate command 322 is greater than or equal to the injector blockage threshold 340 (for example, the first test point 344), the reductant delivery system 30 is operating close enough to the normal system curve 310 that no error is warranted.

The line blockage threshold 342 may be at a pressure differential above the pressure differential of the blocked line curve 314 at the second dosing rate command 322. If the pressure differential at the second dosing rate command 322 is less than the line blockage threshold 342 (for example, the second test point 346), the reductant delivery system 30 may be clearly operating below its desired capacity so that an error is warranted.

If the pressure differential at the second dosing rate command 322 is less than the injector blockage threshold 340 but greater than or equal to the line blockage threshold 342 (for example, the third test point 348, which is at a second pressure differential 349), the status of the reductant delivery system 30 may still not be clear. Accordingly, the offset pressure differential between the two third test points 338, 348 may be calculated and used to further diagnose the operation of the reductant delivery system 30.

As shown, the third test points 338, 348 are separated horizontally by a horizontal offset 350, and vertically by a vertical offset 352. The horizontal offset 350 is the difference between the first and second commanded dosing rates 320, 322. The vertical offset 352 is the difference in pressure differential (i.e., the "offset pressure differential") between the first and second pressure differentials 339, 349 of the third test points 338, 348. The vertical offset 352 or pressure differential offset 352 divided by the horizontal offset 350 provides the slope of the line 324, which may help to further diagnose the operation of the reductant delivery system 30.

For example, if the slope of the line 324 resembles that of the blocked injector curve 312 between the first and second commanded dosing rates 320, 322, it may be concluded that the injector 36 is at least partially blocked. This may warrant an error. However, if the slope of the line 324 more closely resembles that of the blocked line curve 314 between the first and second commanded dosing rates 320, 322, it may be concluded that the dosing line 40 is at least partially blocked. However, since neither of the third test points 338, 348 is under the corresponding line blockage threshold 332, 342, the blockage is not sufficient to warrant an error.

The horizontal offset 350 may be a known, fixed value that remains constant with each diagnostic cycle involving measurement at both commanded dosing rates 320, 322. Thus, analysis of the slope of the line 324 may be performed by comparing the offset pressure differential 352 to a known threshold, e.g., a threshold offset pressure differential such as the exemplary threshold offset pressure differential 360 shown in FIG. 3. If the offset pressure differential 352 is greater than or equal to the threshold offset pressure differential 360 (as is the case in FIG. 3), an error may be warranted due to the presence of at least a partial blockage in the injector 36 as set forth above. However, if the offset pressure differential 352 were less than or equal to the threshold offset pressure differential 360, no error may be warranted, as also set forth above.

Figure 4:
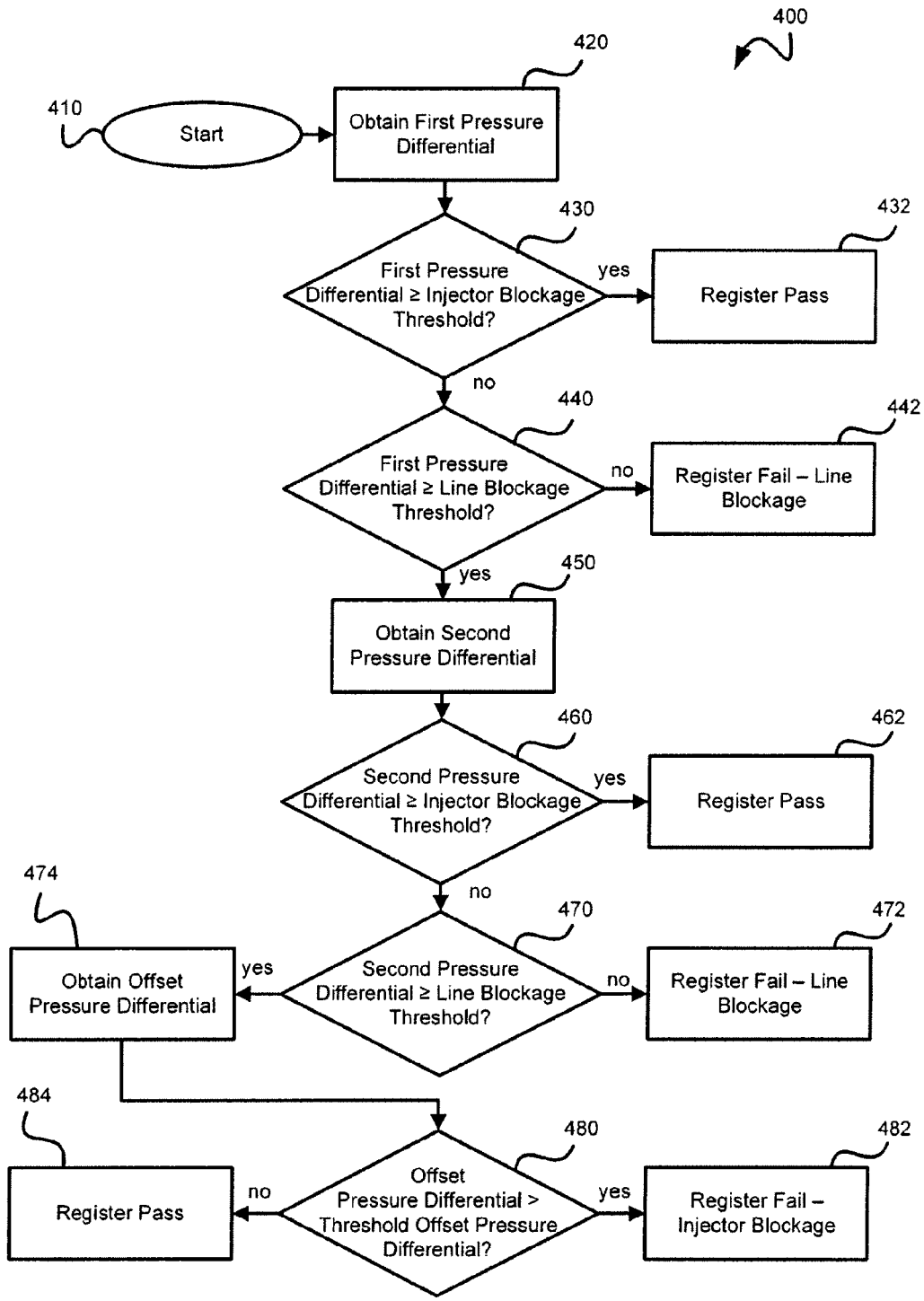
FIG. 4 is a flow chart diagram illustrating a method for diagnosing the performance of a reductant delivery system according to one embodiment.

Referring to FIG. 4, a flow chart diagram illustrates a method 400 for diagnosing the performance of the reductant delivery system 30 according to one embodiment of the invention. The various steps of the method 400 may be carried out by the controller 100.

The method 400 may start 410 with obtaining a first pressure differential at 420. This step 420 may include sampling high pressure sensor data 220 during operation of the reductant delivery system 30 at first and second operating conditions and using this data to provide a first pressure differential that is the pressure drop, or pressure differential between the two operating conditions. For example, the step 420 may entail obtaining one of the test points 334, 336, 338 shown on the first dosing rate command 320 of FIG. 3. The step 420 will be shown and described in greater detail in connection with FIG. 5.

Once the first pressure differential has been obtained at 420, the method 400 then makes a determination 430 of whether the first pressure differential is greater than or equal to the injector blockage threshold 330 for the first dosing rate command 320. With reference to FIG. 3, this step 430 is determining whether the first pressure differential is greater than or equal to the injector blockage threshold 330 (like the first test point 334) or not (like the second and third test points 336, 338). If the first pressure differential is greater than or equal to the injector blockage threshold 330, the reporting module 216 may report that the reductant delivery system 30 is functioning properly, for example, by registering a performance status 230 indicating a "pass" as at 432. The method may then stop until it is again time to diagnose the performance of the reductant delivery system 30. If the first pressure differential is less than the injector blockage threshold 330, the method 400 continues on to step 440, reflecting a determination that more analysis and/or testing is needed to provide the performance status 230.

At step 440, the method 400 makes a determination 440 of whether the first pressure differential is greater than or equal to the line blockage threshold 332 for the first dosing rate command 320. With reference to FIG. 3, this step 440 is determining whether the first pressure differential is greater than or equal to the line blockage threshold 332 (like the first and third test points 334, 338) or not (like the second test point 336). If the first pressure differential is less than the injector blockage threshold 330, the reporting module 216 may report that the reductant delivery system 30 is not functioning properly, for example, by registering a performance status 230 indicating a "fail" as at 442. If desired, the performance status 230 may also indicate that the failure is due to blockage of the dosing line 40. The method may then stop until it is again time to diagnose the performance of the reductant delivery system 30. If the first pressure differential is greater than or equal to the line blockage threshold 332, the method continues on to step 450, reflecting a determination that more analysis and/or testing is needed to provide the performance status 230.

At step 450, the method 400 obtains a second pressure differential. This step 450 may include sampling high pressure sensor data 220 during operation of the reductant delivery system 30 at third and fourth operating conditions and using this data to provide a second pressure differential that is the pressure drop, or pressure differential between the two operating conditions. For example, the step 450 may entail obtaining one of the test points 344, 346, 348 shown on the second dosing rate command 322 of FIG. 3. The step 450 will be shown and described in greater detail in connection with FIG. 6.

Once the second pressure differential has been obtained at 450, the method 400 then makes a determination 460 of whether the second pressure differential is greater than or equal to the injector blockage threshold 340 for the second dosing rate command 322 or not. With reference to FIG. 3, this step 460 is determining whether the second pressure differential is greater than or equal to the injector blockage threshold 340 (like the first test point 344) or not (like the second and third test points 346, 348). If the second pressure differential is greater than or equal to the injector blockage threshold 340, the reporting module 216 may report that the reductant delivery system 30 is functioning properly, for example, by registering a performance status 230 indicating a "pass" as at 462. The method may then stop until it is again time to diagnose the performance of the reductant delivery system 30. If the second pressure differential is less than the injector blockage threshold 340, the method 400 continues on to step 470, reflecting a determination that more analysis and/or testing is needed to provide the performance status 230.

At step 470, the method 400 makes a determination 470 of whether the second pressure differential is greater than or equal to the line blockage threshold 342 for the second dosing rate command 322. With reference to FIG. 3, this step 470 is determining whether the second pressure differential is greater than or equal to the line blockage threshold 342 (like the first and third test points 344, 348) or not (like the second test point 346). If the second pressure differential is less than the injector blockage threshold 340, the reporting module 216 may report that the reductant delivery system 30 is not functioning properly, for example, by registering a performance status 230 indicating a "fail" as at 472. If desired, the performance status 230 may also indicate that the failure is due to blockage of the dosing line 40. The method may then stop until it is again time to diagnose the performance of the reductant delivery system 30. If the second pressure differential is greater than or equal to the line blockage threshold 342, the method continues on to step 474, reflecting a determination that more analysis and/or testing is needed to provide the performance status 230.

At step 474, the method 400 obtains an offset pressure differential such as the offset pressure differential 352 shown in FIG. 3. This may be accomplished, for example, by subtracting the second pressure differential from the first pressure differential.

Once the offset pressure differential has been obtained, it is compared in step 480 with the threshold offset pressure differential (for example, the threshold offset pressure differential 360 in FIG. 3). If the offset pressure differential is greater than or equal to the threshold offset pressure differential, the method 400 may, at step 482, register a "fail." If desired, the performance status 230 may also indicate that the failure is due to blockage of the injector 36. This is because a high offset pressure differential indicates a slope more like the blocked injector curve 312 than the blocked line curve 314.

If the offset pressure differential is less than or equal to the threshold offset pressure differential, the method 400 may, at step 484, register a "pass" because, although the pressure differentials were less than the injector blockage thresholds 330, 340, they were greater than or equal to the line blockage thresholds 332, 342, and the offset pressure differential was less than or equal to the threshold offset pressure differential, therefore the level of blockage in the dosing line 40 may be insufficient to warrant immediate action. If desired, the performance status 230 may reflect that a potential blockage of the dosing line 40 was detected, but it is below the failure reporting threshold of the method 400.

Figure 5:
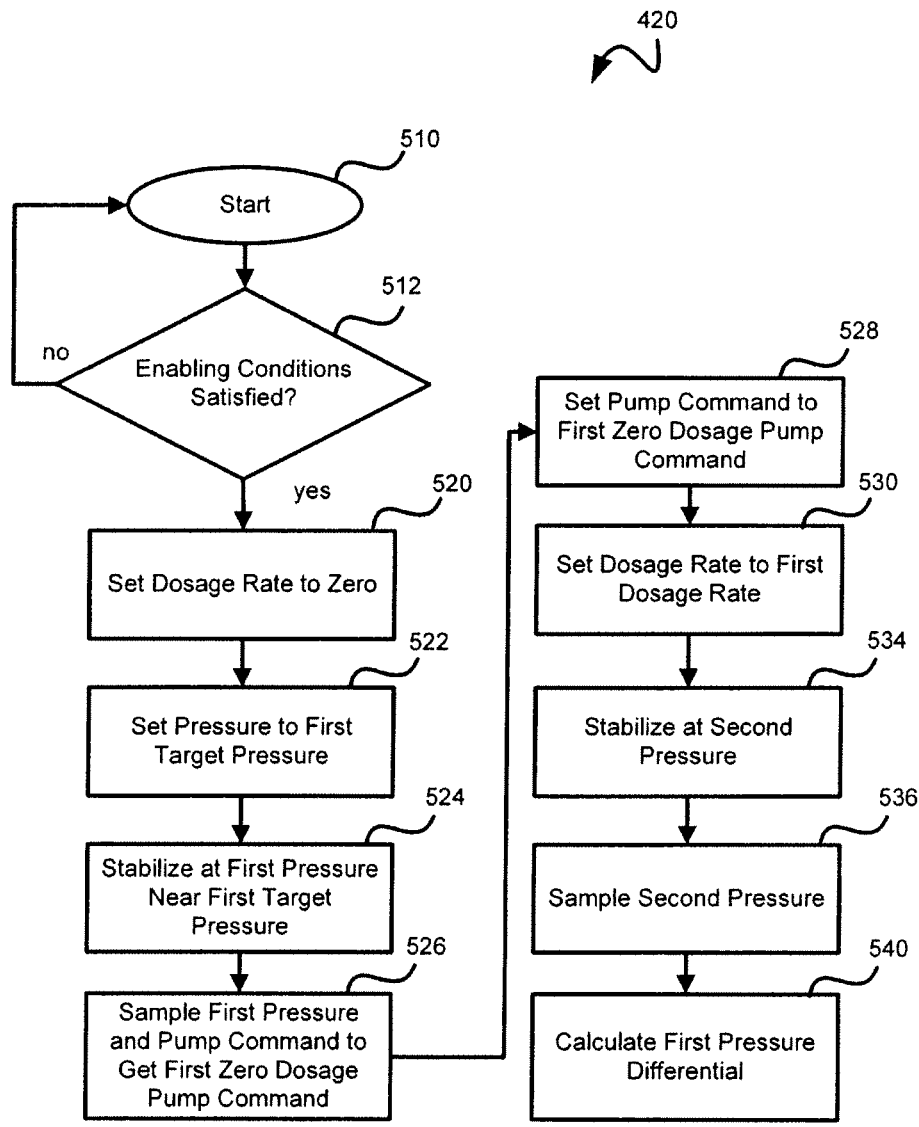
FIG. 5 is a flow chart diagram illustrating the step of obtaining the first pressure differential of FIG. 4 in greater detail.

Referring to FIG. 5, a flow chart diagram illustrates the step 420 of obtaining the first pressure differential of FIG. 4 in greater detail. The step 420 may begin 510 with determining whether the enabling conditions for intrusive testing have been satisfied. As mentioned above, these enabling conditions can include a wide variety of conditions related to the passage of time, the performance of the internal combustion engine 20, the operation of the vehicle of which the engine system 10 is a part, etc. If the enabling conditions have not been satisfied, the step 420 does not progress further until they have. The determination 512 may be repeated with intervening time intervals, if desired, until the enabling conditions are satisfied.

Once the enabling conditions are satisfied, the method 420 continues to a step 520 at which the dosage rate of the reductant delivery system 30 is set to zero, for example, by overriding the normal operations of the control module 202 to cause the control module 202 to issue a dosing command 104 that closes the control valve 42 (e.g., a zero dosing command). This will prevent further reductant from being delivered via the injector 36. Rather, the reductant will cycle through the reductant delivery system 30 via the reductant return line 44.

The pump 34 continues to operate, and is issued pump commands 102 selected to achieve a certain first target pressure as measured by the high pressure sensor 48. According to one embodiment, this target pressure is 900 kPa. The diagnostic module 204 may now cause the control module 202 to accomplish this by issuing pump commands 102 to the pump 34 to adjust the flow rate of reductant through the pump 34 until the high pressure sensor data 220 indicates a pressure close to the first target pressure. In a step 524, this process continues until the high pressure sensor data 220 stabilizes at or near the first target pressure. The reductant delivery system 30 is now in a first "operating condition," which relates to the operational parameters of the reductant delivery system 30 that can be controlled by the controller 100.

Once the first target pressure has been reached with stability, the step 420 may proceed to a step 526 in which the sampling module 210 receives high pressure sensor data 220, pump commands 102, and optionally, other sensor data 222 as the reductant delivery system 30 continues to operate at or near the first target pressure. These data may be stored for analysis. The sampled high pressure sensor data 220 may be averaged to provide an average pressure, or a first pressure, at the first operating condition.

Once sufficient data samples have been gathered, the method 420 may move on to a second operating condition. More precisely, pump commands 102 may be issued to the pump 36 in 528 to keep the pump 36 operating at the average pump command used to effect the first operating condition. However, the dosage rate 530 may be set to a specified non-zero value by issuing the corresponding non-zero dosing command 104 to the control valve 42. The reductant delivery system 30 is stabilized under this second set of operating conditions at 534.

Once the high pressure sensor data 220 has stabilized, the step 420 may proceed to a step 536 in which the sampling module 210 receives high pressure sensor data 220 and optionally, other sensor data 222 as the reductant delivery system 30 continues to operate at or near the first target pressure. The pump commands 102 may not need to be sampled since they remain constant during this period. These data may be stored for analysis. The sampled high pressure sensor data 220 may be averaged to provide an average pressure, or second pressure, at the second operating condition.

Once the first and second pressures have been obtained, the calculation module 212 may determine the pressure differential between them, for example, by subtracting the second pressure from the first pressure. Since the average pump command 102 from the first operating condition was used in the second operating condition, the first and second pressures have been obtained at substantially the same pump command, i.e., the first pump command rate 320 of FIG. 3. The second pressure may be expected to be lower than the first pressure because the second operating conditions provide for dosage of reductant through the injector 36 while the first operating conditions do not provide for dosage, and hence, do not allow egress of fluid from the reductant delivery system 30. The pressure differential may be proportional to the release of reductant through the injector 36 once the control valve 42 opens. Hence, the size of the pressure differential may be inversely proportional to the blockage present in the dosing line 40 and the injector 36. This pressure differential is then used in step 430 and the following steps of the method 400 of FIG. 4.

Figure 6:
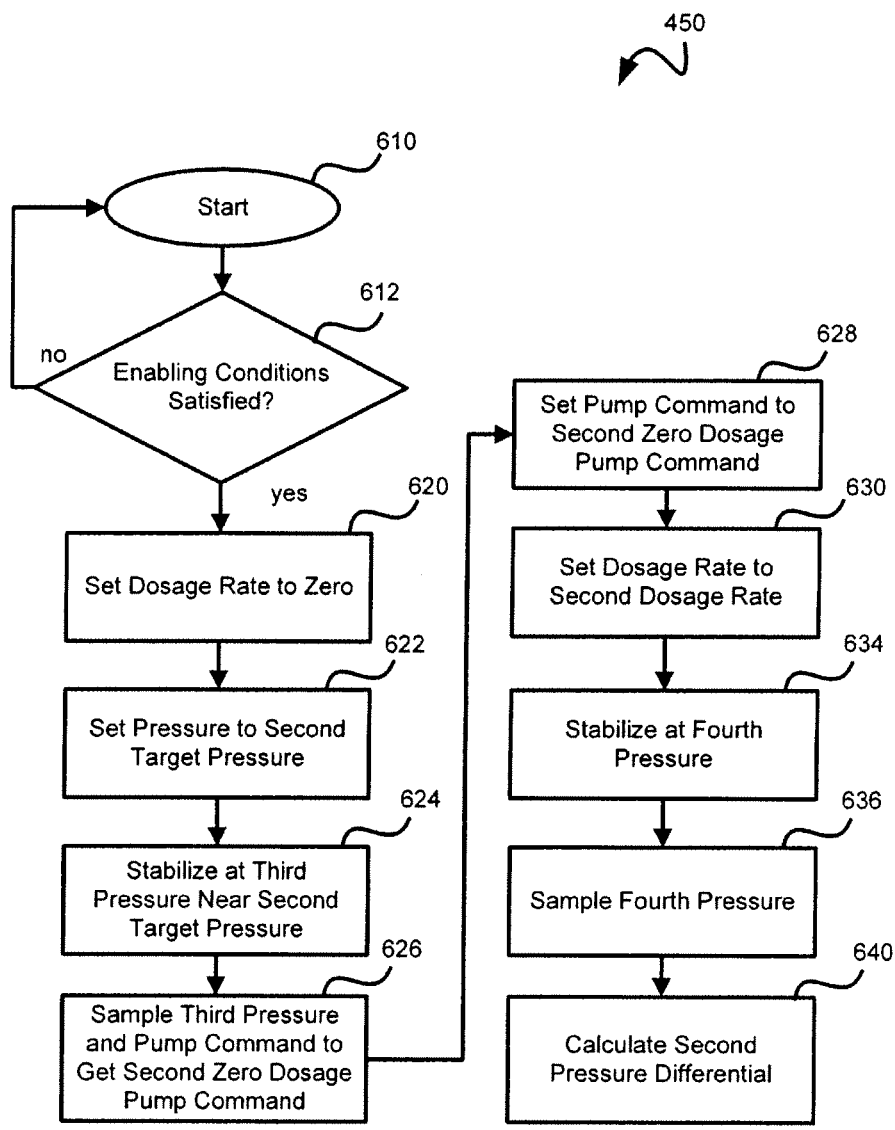
FIG. 6 is a flow chart diagram illustrating the step of obtaining the second pressure differential of FIG. 4 in greater detail.

Referring to FIG. 6, a flow chart diagram illustrates the step 450 of obtaining the second pressure differential of FIG. 4 in greater detail. The various steps 612, 620, 622, 624, 626, 628, 630, 634, 636, 640 are generally analogous to their counterparts 512, 520, 522, 524, 526 528, 530, 534, 536, 540 of FIG. 5. Accordingly, the description of FIG. 5 above also applies to FIG. 6. The step 626 may sample third and fourth pressures at third and fourth operating conditions, respectively, of the reductant delivery system 30. The third and fourth pressures may thus be sampled at or near a second dosing rate command 322, which is lower than the first dosing rate command 320 in FIG. 3.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for diagnosing a reductant delivery system having a reductant pump and a reductant doser, the method comprising:

operating the reductant pump to urge the reductant to flow through the reductant delivery system at a first operating condition;

sampling reductant pressure during operation of the reductant pump to urge the reductant to flow through the reductant delivery system at the first operating condition to determine a first pressure at which the reductant is pressurized within the reductant delivery system;

operating the reductant pump to urge the reductant to flow through the reductant delivery system at a second operating condition different from the first operating condition;

sampling reductant pressure during operation of the reductant pump to urge the reductant to flow through the reductant delivery system at the second operating condition to determine a second pressure at which the reductant is pressurized within the reductant delivery system;

calculating a pressure differential between the first and second pressures to provide a first pressure differential;

comparing the first pressure differential with a threshold pressure differential comprising an injector blockage threshold defining a pressure differential boundary between the reductant delivery system in an unblocked condition and the reductant delivery system with a blocked injector;

comparing the first pressure differential with a second threshold pressure differential responsive to the first pressure differential being greater than or equal to the first threshold pressure differential, wherein the second threshold pressure differential comprises a line blockage threshold defining a pressure differential boundary between the reductant delivery system with a blocked injector and the reductant delivery system with a blocked line;

responsive to the first pressure differential being greater than or equal to the line blockage threshold:

operating the reductant pump to urge the reductant to flow through the reductant delivery system at a third operating condition and to urge the reductant to flow through the reductant delivery system at a fourth operating condition different from the first, second, and third operating conditions;

sampling a third pressure of reductant at the third operating condition and a fourth pressure of reductant at the fourth operating condition;

calculating a second pressure differential between the third and fourth pressures; and comparing the second pressure differential with a second threshold pressure differential; and outputting a performance status to a vehicle system based on the comparison of the second pressure differential with the second threshold pressure differential.

2. The method of claim 1, wherein operating the reductant pump to urge the reductant to flow through the reductant delivery system at a first operating condition comprises urging the reductant to flow through the reductant delivery system at a first flow rate needed to maintain the first pressure at a target pressure with no dosing of reductant.

3. The method of claim 2, wherein operating the reductant pump to urge the reductant to flow through the reductant delivery system at a second operating condition comprises operating the reductant pump to urge the reductant to flow through the reductant delivery system at a second flow rate based on the first flow rate with dosing of reductant.

4. The method of claim 1, wherein the vehicle system is an on-board diagnostic system.

5. A method for diagnosing a reductant delivery system having a reductant pump and a reductant doser, the method comprising:
   operating the reductant pump to urge the reductant to flow through the reductant delivery system at a first operating condition;
   sampling reductant pressure during operation of the reductant pump to urge the reductant to flow through the reductant delivery system at the first operating condition to determine a first pressure at which the reductant is pressurized within the reductant delivery system;
   operating the reductant pump to urge the reductant to flow through the reductant delivery system at a second operating condition different from the first operating condition;
   sampling reductant pressure during operation of the reductant pump to urge the reductant to flow through the reductant delivery system at the second operating condition to determine a second pressure at which the reductant is pressurized within the reductant delivery system;
   calculating a pressure differential between the first and second pressures to provide a first pressure differential;
   comparing the first pressure differential with a threshold pressure differential comprising an injector blockage threshold defining a pressure differential boundary between the reductant delivery system in an unblocked condition and the reductant delivery system with a blocked injector;
   comparing the first pressure differential with a second threshold pressure differential responsive to the first pressure differential being greater than or equal to the first threshold pressure differential, wherein the second threshold pressure differential comprises a line blockage threshold defining a pressure differential boundary between the reductant delivery system with a blocked injector and the reductant delivery system with a blocked line;
   operating the reductant pump to urge the reductant to flow through the reductant delivery system at a third operating condition;
   sampling reductant pressure during operation of the reductant pump to urge the reductant to flow through the reductant delivery system at the third operating condition to determine a third pressure at which the reductant is pressurized within the reductant delivery system;
   operating the reductant pump to urge the reductant to flow through the reductant delivery system at a fourth operating condition different from the third operating condition;
   sampling reductant pressure during operation of the reductant pump to urge the reductant to flow through the reductant delivery system at the fourth operating condition to determine a fourth pressure at which the reductant is pressurized within the reductant delivery system;
   calculating a second pressure differential between the third and fourth pressures;
   calculating an offset pressure differential separating the first and second pressure differentials; and
   comparing the offset pressure differential with a threshold offset pressure differential; and
   outputting a performance status to a vehicle system based on the comparison of the offset pressure differential with the threshold offset pressure differential.

6. The method of claim 5,
   wherein, if the offset pressure differential is greater than or equal to the threshold offset pressure differential, the performance status indicates that the reductant delivery system is not functioning properly;
   wherein, if the offset pressure differential is less than or equal to the threshold offset pressure differential, the performance status indicates that the reductant delivery system is functioning properly.

7. The method of claim 5, wherein the vehicle system is an on-board diagnostic system.

8. An apparatus for diagnosing a reductant delivery system comprising a reductant pump, the apparatus comprising:
   a controller comprising:
      a control module that operates the reductant delivery system at a first operating condition, at a second operating condition different from the first operating condition, at a third operating condition, and at a fourth operating condition different from the third operating condition;
      a sampling module that samples a first pressure of reductant at the first operating condition, samples a second pressure of reductant at the second operating condition, samples a third pressure of reductant at the third operating condition, and samples a fourth pressure of reductant at the fourth operating condition;
      a calculation module that calculates a first pressure differential between the first and second pressures, calculates a second pressure differential between the third and fourth pressures, and further calculates an offset pressure differential separating the first and second pressure differentials; and
      a comparison module that:
         compares the offset pressure differential with a threshold offset pressure differential to determine whether the reductant delivery system is operating properly, and
         outputs a performance status to a vehicle system based on the comparison of the first pressure differential with the first threshold pressure differential or the second threshold pressure differential.

9. The apparatus of claim 8, wherein, if the offset pressure differential is greater than or equal to the threshold offset pressure differential, the performance status indicates that the reductant delivery system is not functioning properly;
   wherein, if the offset pressure differential is less than or equal to the threshold offset pressure differential, the performance status indicates that the reductant delivery system is functioning properly.

10. The apparatus of claim 8, wherein the vehicle system is an on-board diagnostic system.

11. The apparatus of claim 10, wherein the first operating condition comprises a first flow rate for the reductant pump for a first target pressure and a zero dosing command, wherein the second operating condition comprises the first flow rate and a non-zero dosing command, wherein the third operating condition comprises a second flow rate for the reductant pump for a second target pressure and the zero dosing command, wherein the fourth operating condition comprises the second flow rate for the reductant pump and a non-zero dosing command.

12. An apparatus for diagnosing a reductant delivery system comprising a reductant pump, the apparatus comprising:
a controller comprising:
a control module that operates the reductant pump to urge the reductant to flow through the reductant delivery system at a first operating condition and to urge the reductant to flow through the reductant delivery system at a second operating condition different from the first operating condition;
a sampling module that samples a first pressure of reductant at the first operating condition and a second pressure of reductant at the second operating condition;
a calculation module that calculates a first pressure differential between the first and second pressures; and
a comparison module that:
compares the first pressure differential with a first threshold pressure differential comprising an injector blockage threshold defining a pressure differential boundary between the reductant delivery system in an unblocked condition and the reductant delivery system with a blocked injector, and
compares the first pressure differential with a second threshold pressure differential responsive to the first pressure differential being greater than or equal to the first threshold pressure differential, wherein the second threshold pressure differential comprises a line blockage threshold defining a pressure differential boundary between the reductant delivery system with a blocked injector and the reductant delivery system with a blocked line;
wherein, responsive to the first pressure differential being greater than or equal to the line blockage threshold:
the control module operates the reductant pump to urge the reductant to flow through the reductant delivery system at a third operating condition and to urge the reductant to flow through the reductant delivery system at a fourth operating condition different from the first, second, and third operating conditions;
the sampling module samples a third pressure of reductant at the third operating condition and a fourth pressure of reductant at the fourth operating condition;
the calculation module calculates a second pressure differential between the third and fourth pressures;
the comparison module compares the second pressure differential with the second threshold pressure differential; and the control module outputs a performance status to a vehicle system based on the comparison of the second pressure differential with the second threshold pressure differential.

13. The apparatus of claim 1, wherein at the first operating condition the control module operates the reductant pump to urge the reductant to flow through the reductant delivery system at a first flow rate needed to maintain the first pressure at a target pressure with no dosing of reductant.

14. The apparatus of claim 13, wherein at the second operating condition, the control module operates the reductant pump to urge the reductant to flow through the reductant delivery system at a second flow rate based on the first flow rate with dosing of reductant.

15. The apparatus of claim 12, wherein the vehicle system is an on-board diagnostic system.

16. The apparatus of claim 12, wherein the first operating condition comprises a first flow rate for the reductant pump and a zero dosing command, wherein the second operating condition comprises the first flow rate for the reductant pump and a non-zero dosing command.

17. An apparatus for diagnosing a reductant delivery system comprising a reductant pump, the apparatus comprising:
a controller comprising:
a control module that operates the reductant pump to urge the reductant to flow through the reductant delivery system at a first operating condition and to urge the reductant to flow through the reductant delivery system at a second operating condition different from the first operating condition;
a sampling module that samples a first pressure of reductant at the first operating condition and a second pressure of reductant at the second operating condition;
a calculation module that calculates a first pressure differential between the first and second pressures; and
a comparison module that:
compares the first pressure differential with a first threshold pressure differential comprising an injector blockage threshold defining a pressure differential boundary between the reductant delivery system in an unblocked condition and the reductant delivery system with a blocked injector,
compares the first pressure differential with a second threshold pressure differential responsive to the first pressure differential being greater than or equal to the first threshold pressure differential, wherein the second threshold pressure differential comprises a line blockage threshold defining a pressure differential boundary between the reductant delivery system with a blocked injector and the reductant delivery system with a blocked line,
wherein:
the control module further operates the reductant pump to urge the reductant to flow through the reductant delivery system at a third operating condition and to urge the reductant to flow through the reductant delivery system at a fourth operating condition different from the third operating condition;
the sampling module further samples a third pressure of reductant at the third operating condition and a fourth pressure of reductant at the fourth operating condition;
the calculation module further calculates a second pressure differential between the third and fourth pressures and an offset pressure differential separating the first and second pressure differentials;

the comparison module further compares the offset pressure differential with a threshold offset pressure differential; and the control module outputs a performance status to a vehicle system based on the comparison of the second pressure differential with the second threshold pressure differential.

18. The apparatus of claim 17, wherein, if the offset pressure differential is greater than or equal to the threshold offset pressure differential, the performance status indicates that the reductant delivery system is not functioning properly;

wherein, if the offset pressure differential is less than or equal to the threshold offset pressure differential, the performance status indicates that the reductant delivery system is functioning properly.

19. The apparatus of claim 17, wherein the third operating condition comprises a second flow rate for the reductant pump and a zero dosing command, wherein the fourth operating condition comprises the second flow rate for the reductant pump and a non-zero dosing command.

20. The apparatus of claim 17, wherein the vehicle system is an on-board diagnostic system.

* * * * *